Figure 1:
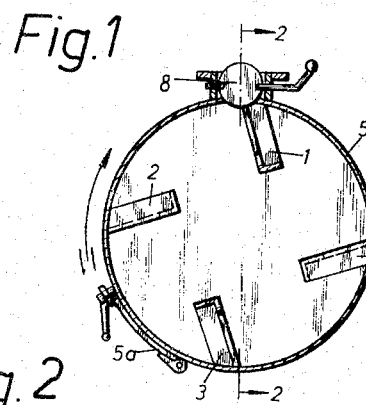

May 23, 1967 W. LÖDIGE ETAL 3,321,186
MIXING MACHINE FOR FLOWABLE AND PULVERULENT, GRANULAR
OR FIBROUS MATERIALS
Filed April 21, 1964 2 Sheets-Sheet 1

INVENTORS
WILHELM LÖDIGE
FRITZ LÖDIGE
JOSEF LÜCKE
BY
*Elmer S. Nelson*
ATTY.

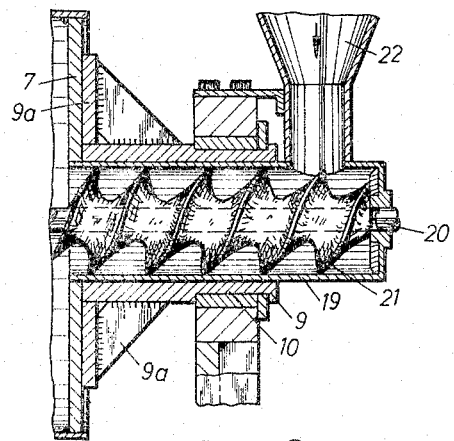
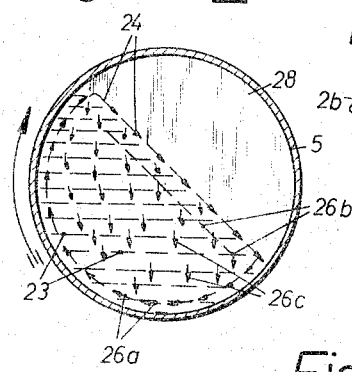
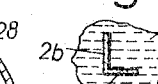
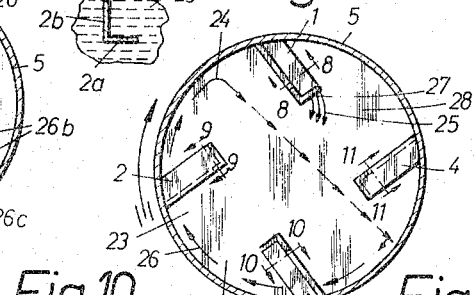
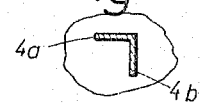
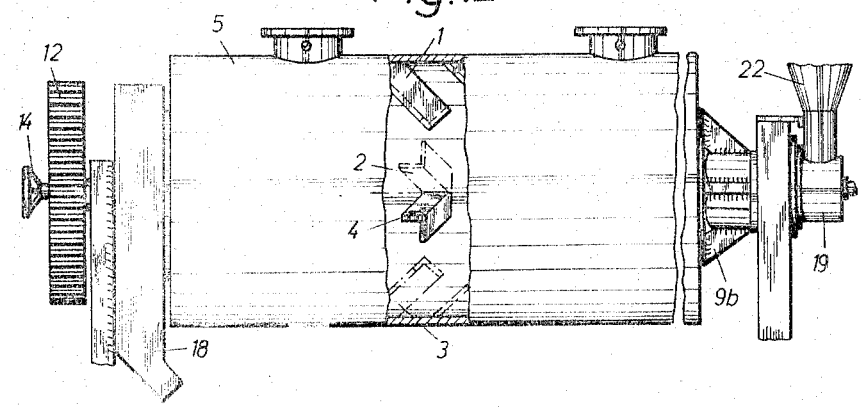

United States Patent Office 3,321,186
Patented May 23, 1967

3,321,186
MIXING MACHINE FOR FLOWABLE AND PULVERULENT, GRANULAR OR FIBROUS MATERIALS
Wilhelm Lödige and Fritz Lödige, both of Elsener Strasse 9c, and Josef Lücke, Im Lohfield 13, all of Paderborn, Germany
Filed Apr. 21, 1964, Ser. No. 361,326
Claims priority, application Germany, Apr. 26, 1963, L 44,741
6 Claims. (Cl. 259—3)

This invention relates to mixers for flowable and pulverulent, granular or fibrous materials.

The oldest known mixers are free-fall mixers including mixing vessels which are devoid of any built-in mixing elements and are either manually or mechanically rotatable. The mixing effect in these free-fall mixers is very poor, but slight improvements have been achieved by fitting guide vanes in the mixing vessel or by giving the latter a particular shape. In these containers, the material to be mixed executes primarily a rotary motion in a constant direction in these known mixing vessels. Where materials of different granulation and different density are to be mixed, this rotary movement can easily lead to segregation instead of mixing, since the larger and lighter components of the mixture trickle downwardly along the surface of the angle of elevation, while the smaller and heavier constituents move downwardly through the mixing aggregate during the rotary motion due to the greater weight thereof and the greater gravity forces. A further improvement of the mixing effect has been achieved by fitting guide blades which laterally displace the material to be mixed in alternating directions as the vessel rotates. Another proposal for improving the mixing effect was to give the mixing container a particular form; such mixing vessels have had a hexagonal or octagonal or double-conical shape, and another such mixer is the tumbling mixer. The lateral displacement of the materials to be mixed during rotation has only a very low efficiency, for which reason the mixers of this type have nearly always been shorter in length than their diameter. Consequently, only small mixers of this type have ever been built. It has also been proposed to improve the efficiency of gravity mixers by arranging lifting blades inside the mixing vessel to convey the material to be mixed in a radial or axial direction. However, the results achieved by such improvements are still unsatisfactory.

To improve the mixing action, forced mixers have been constructed. Such mixers comprise stationary or slowly rotatable vessels in which rotatable mixing tools are arranged on a shaft. In various forced mixers, it is currently possible to achieve mixing precisions of 98–100% within a very short mixing period. However, there are materials which cannot, or preferably should not, be processed in forced action mixers, e.g. explosives because of the risk of an explosion, and very coarse-grained or long-fibre materials which have a strong tendency to adhere to the inner drum surface and the mixing tools when a pressure is exerted on the materials by the mixing tools for example. The grain structure of some other materials is destroyed when treated in forced action mixers. Consequently, gravity mixers have to be used in these and similar cases. There is an increasing industrial demand for mixers with larger capacities, for homogenizing, i.e. mixing, raw products of varying properties in large batches, in order to avoid variations of the quality of the finished products prepared therefrom. Forced action mixers, of, for example, 50,000 litres capacity, could rapidly and satisfactorily solve such mixing problems, but the resulting power consumption and plant expenditure would be uneconomical in almost all cases. On the other hand, if gravity mixers of a similar size were to be built, then excessive space requirements would have to be accepted, since the diameter of such a mixer would correspond to the height of several factory floors, to which there must be added the poor mixing efficiency as another drawback.

It is, therefore, an object of the present invention to provide a free-flowing mixer for flowable and pulverulent, granular or fibrous materials, said mixer having an improved mixing efficiency.

Another object of the present invention is to provide such improved free-flowing mixers which may be built smaller in size for a given mixing efficiency.

A further object of the present invention is to provide such mixers which overcome the disadvantages of known free-flowing mixers.

Still other objects of the present invention and advantages thereof will become apparent as the description proceeds.

Accordingly, the mixer of this invention comprises a horizontally rotatable mixing vessel which may be closed substantially dust-proof, means for charging and discharging said mixing vessel with the materials to be mixed, axially spaced trough-like lifting and mixing means arranged on the inner wall of said mixing vessel and distributed over the circumference thereof, wherein each of said trough-like lifting and mixing means extends from said vessel wall and is arranged in said mixing vessel in such a manner that an acute angle is formed between the longitudinal axis of said trough-like lifting and mixing means and a line intersecting each of them and being parallel to the axis of rotation of said mixing vessel, that the longitudinal axis of said trough-like mixing means is parallel to a radial plane passing through the axis of rotation of said mixing drum, and that the inner face of said trough-like lifting and mixing means face away from the axis of rotation of said mixing vessel.

Preferably, at least one pair of trough-like lifting and mixing means is arranged on the inner wall of the mixing vessel, substantially opposite to each other in relation to the circumference of the container, the longitudinal axes of the two trough-like lifting and mixing means being directed in opposite directions at an acute angle to a line intersecting each of them and parallel to the axis of rotation of the mixing vessel so that the two lifting and mixing means displace the material in opposite directions. If several such pairs of trough-like lifting and mixing means are arranged in rows side by side, the rows can be parallel to the axis of rotation of mixing vessel or they may have a spiral arrangement in relation to the axis. The lifting and mixing means working in opposite directions must be so dimensioned that the delivery is substantially equal in both directions.

If in the preferred embodiment more than a pair of trough-like lifting and mixing means is arranged on the inner drum wall substantially in a plane perpendicular to its axis of rotation the longitudinal axes of said trough-like lifting and mixing means are directly alternatingly in opposite each directions at an acute angle to a line intersecting each of them and parallel to the axis of rotation of the mixing drum, i.e. the longitudinal axes of each row of trough-like lifting and mixing means are at an acute angle in direction opposite to the direction of the longitudinal axes of the neighboring rows of trough-like lifting and mixing means.

The distance of the trough-like lifting and mixing means from the radial plane which is parallel to their longitudinal axes and pases through the axis of rotation of the mixing vessel, is preferably such that on reaching the discharging angle the lifting and mixing means emerge from the material to be mixed, otherwise the lifting and mixing means cannot exert their additional mixing effect in the upper empty space of the mixing container. Advantageously, this distance is so great and the trough-like lifting and mixing means are of such a length that the material lifted by them falls back substantially over the rotational axis of the container into the material in rotary motion within the container.

The mixing vessel may be square or polygonal in cross-section or may have other forms. The most advantageous and the simplest to manufacture however is a vessel of cylindrical shape with head-pieces on both ends. The length of the mixing vessel can be substantially greater than its diameter; a large mixer may for example have a diameter of 2.5–3 metres for a length of 10 metres.

The trough-like lifting and mixing means may have the form of angle bars, may be channel shaped or may have the shape of scoops.

The greater the length of the trough-like mixing means, the deeper they will reach into the mass to be mixed and consequently the greater the amounts of material which are laterally discharged in longitudinal direction. Moreover, the long lifting and mixing means reduce the danger of segregation when materials with strongly differing grain size and density are to be mixed since they can reach deeper into the mass.

From the preceding remarks it would appear that the most favorable results would be obtained when the trough-like mixing means extend close to the rotational axis. It would appear that this would increase the power requirements. However, it has been found that this arrangement is the most advantageous, without substantially increasing power consumption in comparison to a simple gravity or free-flowing mixer. Since the length of the trough-like mixing means and the distance of the longitudinal axes of the lifting and mixing means from the radial plane passing through the axis of rotation of the mixing container form a relationship, the trough-like mixing means may be shortened for a given power consumption and will give the same mixing efficiency when this distance is increased. However, this distance must not be so great, or the length of the trough-like mixing and lifting means must not be reduced to such an extent that the central core of the aggregate mass is not mixed by the mixing means. For example, it has been found to be advantageous in a cylindrical mixer vessel for the aforementioned distance to be 2–30% of the vessel diameter, and the aforesaid mixing means length to be 20–40% of the drum diameter. In square or polygonal mixers, this distance and this length must be chosen differently, but always so that the portions of the aggregate lifted out by the trough-like mixing means are always taken from that zone in which a segregation occurs in a normal gravity of free-flowing mixer. The length of channel shaped mixing and lifting means should be at least twice as great as their working width.

At least two rows of mixing means must be built into each mixing container. In mixers with greater diameters at least four such rows will be advantageously fitted. A mixing vessel of, for example, a length of 10 metres, could have 10 lifting and mixing means with a working width of 0.5 metres, and spaced at intervals of 0.5 metres.

Where lifting and mixing means of angle-bar shape are employed, one of the two spars will be advantageously arranged parallel to a radial plane passing through the axis of rotation of mixing vessel and serves to lift and carry the portions of the material to be mixed out of the aggregate mass. The other spar of an angle-bar shaped lifting and mixing means serves firstly as a lateral imitation as these portions of material are lifted out. Then, when the working surface of the material-bearing spar has reached an oblique position due to the rotation of the mixing vessel, in which the material thereon located begins to slide off over the front edge, this spar has the task of deflecting laterally the sliding material, i.e. to displace it in rotation-axial direction of the vessel. By fitting the aforedescribed lifting and mixing means, a good additional mixing effect will be achieved in the upper dead space of the mixer owing to the lateral displacement of portions of the material to be mixed, that is, in addition to the hitherto known rotary mixing action in the gravity or free-flowing mixers. Viewed in transverse section, each row of lifting and mixing means will take portions of the material to be mixed from different areas of the aggregate mass and, on reaching maximum elevation, discharge it slowly laterally among the portions of material sliding along the angle of slope, to fill up again when reaching the lowest points of its course and thus to repeat the process. The lifting and mixing means according to the present invention are advantageously so arranged within the rows that, for example, the lifting and mixing means discharging to the left takes material—viewed in longitudinal section—from that zone which is located between two lifting and mixing means discharging to the right. Besides the aforedescribed mixing effect in the upper dead space of the vessel, the lifting and mixing means also have a laterally displacing action within the aggregate mass, especially so on emerging from the aggregate, since the material being mixed is always sliding somewhat on the rotating, rising wall of the mixing vessel.

All of the known gavity or free-flowing mixers reach their optimum mixing efficiency at a load of between 40 and 50% of their capacity. With greater or smaller loads, the mixing effect decreases sharply or disappears altogether. The mixer of this invention is not affected by the degree of filling, with regard to efficiency that is so long as it is not smaller than 25% and does not exceed 75%, since the lifting and mixing means, owing to their length, can cary out their task of lifting and laterally scattering the material prefectly in this range. The most favourable degree of loading is of 60%, where the optimum mixing effect is reached in the shortest time with good utilization of the available space. Repeated experiments have shown that in a mixer according to the invention after a mixing period of only 30 minutes the analytical results do not deviate by more than 5% from the total value on samples of 5 g. These results are substantially better than those obtained with forced-action mixers of poor efficiency. In comparison to good forced-action mixers, this mixing period appears to be too long, but it is nevertheless very short in comparison to the known gravity or free-falling mixers.

Owing to the favorable dimensions of the mixing vessel, a large mixer of for example 50,000 litres gross capacity can be installed in a room with a normal floor height of 3 to 4 metres. The power requirements and the plant costs remain within acceptable limits, even for low-priced material to be mixed. The power requirements of gravity or free-flowing mixers are always substantially lower than those of forced-action mixers.

The mixer of the invention can be utilized for batch operation and, by providing it with suitable feed and evacuation means, for continuous operation as well.

The speed of rotation of the mixing vessel depends on its diameter, as in all gravity or free-flowing mixers. The peripheral velocity must never be so high that it interferes with the downward flow of the material reaching the angle of slope.

When the mixing vessels are constructed of a synthetic plastics material, for example "Plexiglas," or when the diameter of the mixing vessel is small, it is difficult or altogether impossible to fit the trough-like lifting and mixing means to the container walls. In this case, it is more advantageous to fit the mixing means to a rod frame and to insert this assembly into the vessel from one end. Of course, these rods, and thus the mixing and lifting means, must be at a small distance from the wall of the vessel. The same method of construction can be employed to improve the mixing effect where rolled sheets are used, i.e. in transport drums rotating on rollers. In this case too, the lifting and mixing means can be fitted on rods and so inserted into the mixing vessel.

When the lifting and mixing means are arranged in mixing vessels rotating on powered rollers, good mixing effects will be achieved in substantially reduced mixing periods.

In many mixing operations, for example in the blending of tea, it is desirable to remove dust at the same time as blending. Said dust is in part formed during the mixing process itself. In order to remove this dust, the mixing vessel, or a portion of it, may be made of sieve netting, so that by applying suitable means with or without the aid of an exhauster the material can be rendered dust-free at the same time.

Figure 2:
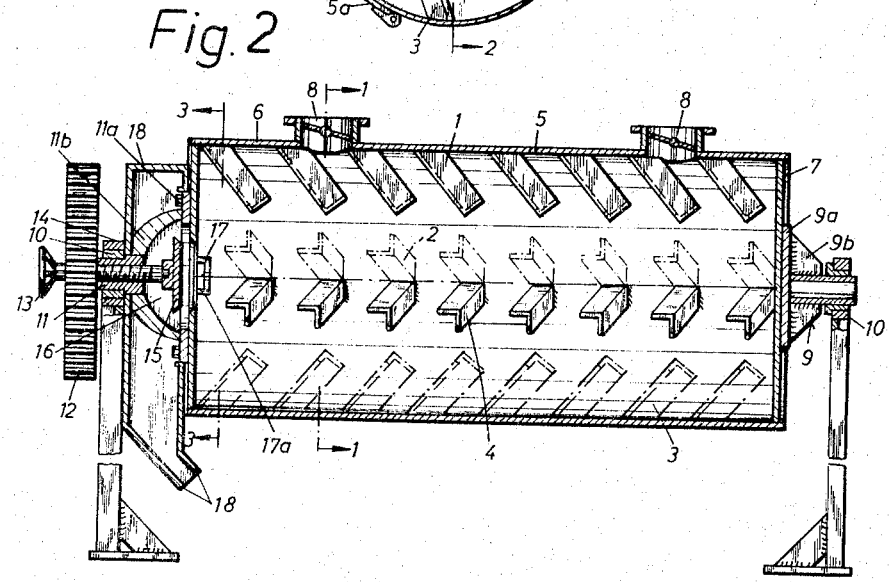
Figure 3:
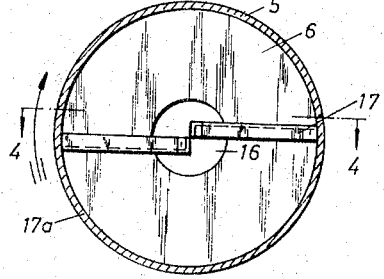
Figure 4:
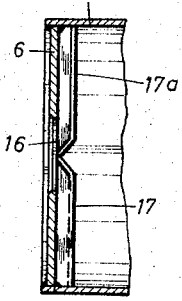

In the accompanying drawings:

FIG. 1 is a cross-sectional view of a mixing vessel containing four rows of trough-like mixing and lifting means which are shown in a perspective, FIG. 2 is a longitudinal section, the mixing vessel being shown without a drum jacket at the front and the position of the mixing and lifting means corresponding to that of FIG. 1 (view II of FIG. 1), FIG. 3 illustrates the left-hand end wall of the mixing vessel of FIG. 2 as viewed from the inside and illustrates built-in discharge channels and a discharge outlet (view III of FIG. 2), FIG. 4 is a section along the line IV—IV of FIG. 3, showing discharge channels on the inside of the end wall, FIG. 5 shows a screw feeder accommodated in a hollow shaft for continuous operation of the mixer, the screw feeder being fitted to the opposite side of the discharge outlet, FIG. 6 is a transverse section through a gravity or free-flowing mixer without mixing and lifting means, showing the material to be mixed, for a given speed of rotation, the angle of slope being flatter with a material having good flow properties and steeper for a material having very poor flow properties, FIGS. 7 to 11 illustrate the various positions in relation to the vertical assumed by the trough-like mixing and lifting means, during rotation, FIGS. 8 to 11 being sections through the trough-like mixing and lifting means along lines VIII—VIII to XI—XI of FIG. 7, FIG. 12 shows a side elevation of a mixer according to the present invention. For continuous mixing the loading apertures shown atop the mixing vessel 5 are not absolutely necessary. The arrows in FIG. 6 of the drawings are intended to indicate the probable direction of movement of the material to be mixed in the various zones, and the different lengths of the arrows indicate the speeds of these movements, thus, arrows 24 indicate a very rapid dropping movement at the angle of maximum elevation; arrows 26a indicate a rapid rising movement along the drum wall; arrows 26b indicate a slow dropping movement obliquely in the centre; and arrows 26c indicate a very slow dropping movement vertically in the centre.

The smallest, vertical arrows 26c indicate in addition the heavy, fine-grained material, which trickles more rapidly through the coarser and lighter material in the sinking mass (segregation process in the previously known gravity or free-flowing mixers). The segregation process is eliminated in the mixer according to the invention so that the trough-like mixing and lifting means, owing to their distance from the radial plane and their length, take portions of the material to be mixed from different zones of the aggregate mass and from the central core as well.

Angle-bar shaped lifting and mixing means or rows of such lifting and mixing means for displacing the material in longitudinal direction are indicated by 1, 2, 3 and 4. The mixing vessel has a jacket 5 with a cleaning and assembling flap 5a. The vessel has an end wall 6 on the left and right-hand end wall 7. To permit intermittent operation of the mixer, the vessel has two loading apertures 8 with built-in throttle valves; these apertures can also serve for discharging. The end-plate 7 has an axle journal 9 with a flange 9a and bracing junction plates 9b. The axle journal 9 rests in a bearing 10. A discharge aperture 16 is located in the left-hand end plate 6 which can be used when the mixer is intermittently operated but which must be provided for continuous operation of the mixer. Because of the discharge aperture 16, the end plate 6 has an axle journal 11 which is connected to a flange 11a by ribs 11b. The axle journal 11 rotates in the bearing 10.

The axle journal 11 is traversed by a threaded spindle 14, on the right-hand side of which is a disc 15 acting as a lid for the aperture 16. In order to open or close the aperture 16, the lid 15 can be displaced to the left or to the right by rotating a handwheel 13. Discharge troughs 17 and 17a are mounted on the inside of the end-plate 6, and continuously direct portions of the material through the discharge aperture 16 as the vessel rotates. If it is desired to empty the vessel completely, it is necessary to fit a narrow spiral on the inside of the vessel wall; this spiral extends from the discharge troughs 17, 17a and conveys the remainder of the mixed material to the discharge troughs. For dust-free operation, the discharge aperture is covered by a protecting plate 18, the lower end of which is formed as a tunnel-like outlet.

The mixer shown in FIG. 2 can be driven by belt pulleys, cog-wheels 12 or similar elements arranged on the axle journal. A continuous feed means for the material to be mixed must be provided if the mixer is to be operated continuously. Such a feed means is illustrated by way of example in FIG. 5.

The mixer has a feed screw housing 19, containing a rotatable shaft 20 with a screw thread 21. The material to be mixed is supplied to the housing 19 through a feed hopper 22. In FIG. 6, the shaded area 23 illustrates the aggregate mass to be mixed. Owing to the rotation of the mixing drum in the direction of the arrow, there is formed the slope 24, from which the material continuously slides downwards in the direction of the arrows. In FIG. 7, the space filled by the material to be mixed is defined by the arrows 24 and 26. The rows of trough-like mixing and lifting means secured to the vessel walls fill up from the aggregate mass as the drum rotates, lift portions of the material out of the aggregate mass as they emerge therefrom in the sequence 1, 2, 3, 4 and throw these portions 23a, as shown in particular in section A-B in FIG. 8, within the empty space 28 in longitudinal direction to the right or to the left slowly in direction of the arrow 25 on to the downward-trickling surface layer 24 of the aggregate mass 23.

1a, 2a, 3a and 4a indicate the spars of angle shaped lifting and mixing means which lift the portions of the mixed material out of the aggregate mass. Shortly before emerging from the aggregate, the working surfaces of these spars assume a horizontal position, while the spars 1b, 2b, 3b and 4b are vertical at this instant. In the discharging position of the row of lifting and mixing means 1, the material-bearing spar has already risen to a point where its edge is at the same height as the edge b (see FIG. 8).

By the positioning of the trough-like lifting and mixing means obliquely in longitudinal direction of the drum (alternating to left and right), in conjunction with the rotation of the drum, the angle-bar shaped lifting and mixing means change their position in relation to the vertical, so that the two spars of the angle bar form when viewed in section, a V in the empty discharge zone during the discharging period. (See section 8—8, FIG. 7, of blade series 1.) In this position, in which the working surfaces of the lifting and mixing means have an angle of inclination of about 38° to the vertical, the main portion of the material lifted out of the aggregate mass is discharged over the terminal edge 27 (arrows 25 in FIG. 7).

A small amount of material trickles over the edge of the spar 1a before the V-position is reached and after reaching the V-position, the remainder of the material trickles over the edge 1b of the spar. The lifting and mixing means row 2, next in direction of rotation, is still in the aggregate mass 23, as shown in FIG. 9. Section 9—9 shows that the spar 2a is in horizontal position, so that the material resting on the spar 2a is lifted out of the aggregate. In the lower region of the drum, the lifting and mixing means form a mirror-image position, i.e. they are inverted. When considering FIGS. 10 and 11, it must be taken into account that the rows 1 and 3 discharge in forward direction, while the rows 2 and 4 discharge to the rear. As the rows of mixing and lifting means enter the aggregate, a hollow space is formed at first under the working surface of the trough-like mixing and lifting means (see FIGS. 10 and 11). At this instant, the trough-like lifting means are inverted. However, as soon as they have passed the lowest point of their course during rotation of the drum, material trickles from the central core of the aggregate mass into the hollow space, so that the portions of material which are lifted out of the aggregate by each of the trough-like lifting and mixing means and discharge laterally come, from the technical point of view from the most diverse zones of the aggregate. Since the material always slides downwards within the aggregate, especially at the upper angle of slope, a further substantial displacement of the material is brought about as each of the trough-like mixing and lifting means emerges from the aggregate.

What we claim is:

1. A mixing machine for flowable and pulverulent, granular or fibrous materials comprising, in combination, a horizontal rotatable mixing vessel having a length substantially greater than its diameter, means for charging and discharging said mixing vessel with the materials to be mixed, and at least one pair of rows of axially spaced trough-like lifting and mixing means, said rows being arranged on substantially opposite sides of the inner wall of the mixing vessel in relation to the circumference thereof and each of said trough-like lifting and mixing means extending from said vessel wall and being arranged in such a manner that the longitudinal axes of said trough-like lifting and mixing means each form an acute angle with a line intersecting each of them and being parallel to the axis of rotation of said mixing vessel, that said longitudinal axes are parallel to a radial plane passing through the axis of rotation of said mixing vessel, that said longitudinal axes of each row of said trough are at said acute angle in direction opposite to the direction of said longitudinal axes of the neighbouring rows of said trough-like lifting and mixing means, and that the inner faces of said trough-like lifting and mixing means each face away from the axis of rotation of said mixing vessel.

2. A mixing machine as claimed in claim 1, wherein the distance of the trough-like lifting and mixing means from the said radial plane is at least so great that on reaching the angle of discharge the trough-like lifting and mixing means are located outside the aggregate mass of the material to be mixed.

3. A mixing machine as claimed in claim 1, wherein the distance of the trough-like lifting and mixing means from the said radial plane is at least so great and the trough-like lifting and mixing means have at least such a length that the material located on said means is discharged substantially beyond the axis of rotation of the mixing vessel.

4. A mixing machine as claimed in claim 1, wherein the mixing vessel is cylindrical and is rotatable about its longitudinal axis.

5. A mixing machine as claimed in claim 1, wherein the trough-like lifting and mixing means have the form of angle bars, one of the surfaces of the angle bar being substantially parallel to a radial plane passing through the axis of rotation of the mixing vessel.

6. A mixing machine as claimed in claim 1, wherein the rows of the trough-like lifting and mixing means are arranged parallel to the axis of rotation of the mixing vessel.

References Cited by the Examiner

UNITED STATES PATENTS

| | | | |
|---|---|---|---|
| 977,244 | 11/1910 | Wiebe | 259—30 X |
| 1,065,275 | 6/1913 | Rosholt | 259—175 |
| 1,395,171 | 10/1921 | Bishop | 259—81 |
| 2,006,728 | 7/1935 | Ball | 259—175 |
| 2,088,099 | 7/1937 | Venable | 259—3 X |
| 2,708,570 | 5/1955 | Manabe | 259—175 |
| 2,924,513 | 2/1960 | Altimier et al. | 259—3 X |
| 2,978,229 | 4/1961 | Jackson | 259—3 |
| 3,089,791 | 5/1963 | Stirling et al. | 259—3 X |

FOREIGN PATENTS 207,578   7/1956   Australia.

WALTER A. SCHEEL, *Primary Examiner.*

J. M. BELL, *Assistant Examiner.*